SIGNAL SEPARATING CIRCUIT FOR COLOR TELEVISION

Filed April 1. 1949 3 Sheets-Sheet 1

INVENTORS
GORDON L. FREDENDALL
& RAY D. KELL
BY
ATTORNEY

April 28, 1953 G. L. FREDENDALL ET AL 2,636,937

SIGNAL SEPARATING CIRCUIT FOR COLOR TELEVISION

Filed April 1, 1949 3 Sheets-Sheet 2

INVENTORS
GORDON L. FREDENDALL
& RAY D. KELL
BY
ATTORNEY

SIGNAL SEPARATING CIRCUIT FOR COLOR TELEVISION

Filed April 1, 1949 3 Sheets-Sheet 3

INVENTORS
GORDON L. FREDENDALL
& RAY D. KELL
BY
ATTORNEY

Patented Apr. 28, 1953 2,636,937

UNITED STATES PATENT OFFICE 2,636,937

SIGNAL SEPARATING CIRCUIT FOR COLOR TELEVISION

Gordon L. Fredendall, Feasterville, Pa., and Ray D. Kell, Princeton, N. J., assignors to Radio Corporation of America, a corporation of Delaware Application April 1, 1949, Serial No. 84,946

4 Claims. (Cl. 178—5.4)

This invention relates to signalling and more particularly to television and high speed picture transmission.

In television when an object or field of view is periodically scanned in a series of adjacent parallel lines by an electron beam in the television camera and the brightness or darkness of elemental areas are translated into electrical current variations, the energy of these variations is concentrated mainly in a number of distinct clusters of frequencies between which there is very little useful energy. The frequency clusters appear at the frequency of line scanning and harmonics of it. These clusters occupy about 20 per cent of the frequency band, leaving therefore, 80 per cent of the band unused. In connection with this subject, reference is made to the article published by Mertz and Gray entitled "A theory of scanning and its relation to the characteristics of the transmitted signals in telegraphy and television" in The Bell System Technical Journal, vol. 13, pages 464–515; July 1934.

According to this invention the unused gaps of one video frequency band are employed for the transmission of one or more other video signals.

The scarcity of television channels has always been a problem for television development. All sorts of band reduction systems were proposed, but most of them are not practical. With the development of color television the problem of channel space became even more acute, since, if presently known methods are employed, the transmission of color signals may require still a greater bandwidth for each program than are now required for black and white images.

Great savings in bandwidth can be realized if an arrangement of the type taught by this invention be employed.

A primary object of this invention is then to provide a more economical employment of the frequency spectrum for the transmission of television images.

Another object of this invention is to take advantage of the "vacant" spots in a video signal for the transmission of other video signals.

Still another object of this invention is to provide simple means for interleaving the frequencies at the transmitter and simple means for separating the video signals at the receiver.

Other and incidental objects of this invention will be apparent to those skilled in the art from a reading of the following specification and an inspection of the accompanying drawings in which:

Figure 1 shows a block diagram of the video band mixer;

Figures 2 and 3 are the frequency components of the video signals 1 and 2; for simplicity the satellite components are left out;

Figure 4 shows the lower sideband of video signal 2 after being modulated twice and interleaved with video signal 1;

In Figure 5 the video signal 2 modulates a subcarrier and has passed through a vestigial sideband filter;

Figure 6 shows a block diagram of the video band receiver;

Figure 7 shows the frequency response of the transverse filter for signals of the type of video signal 1, when the sum of the outputs from 1 and 1' of Figure 9 are added to the output at point C;

Figure 8 shows the frequency response of the transverse filter for signals of the type of video signal 2, when the sum of the outputs from 1 and 1' of Figure 9 are subtracted from output at point C;

Figure 1:
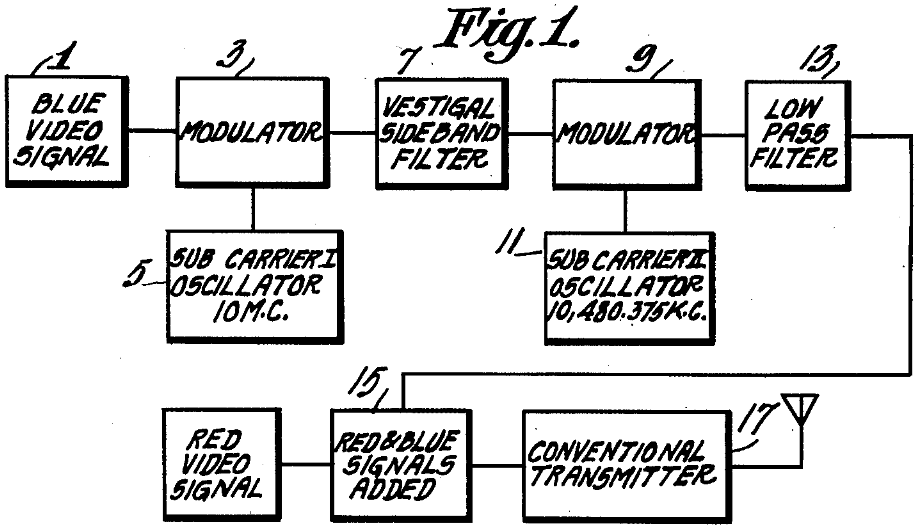

For purpose of simplicity the operation of the example will be limited to two video signals. In the block diagram of Figure 1 it is assumed that color television is used where the red video signal is signal 1 and the blue video signal is signal 2. The blue signal will be mixed into the red signal.

Figures 2, 3, 4, 5, 7, 8, 9:
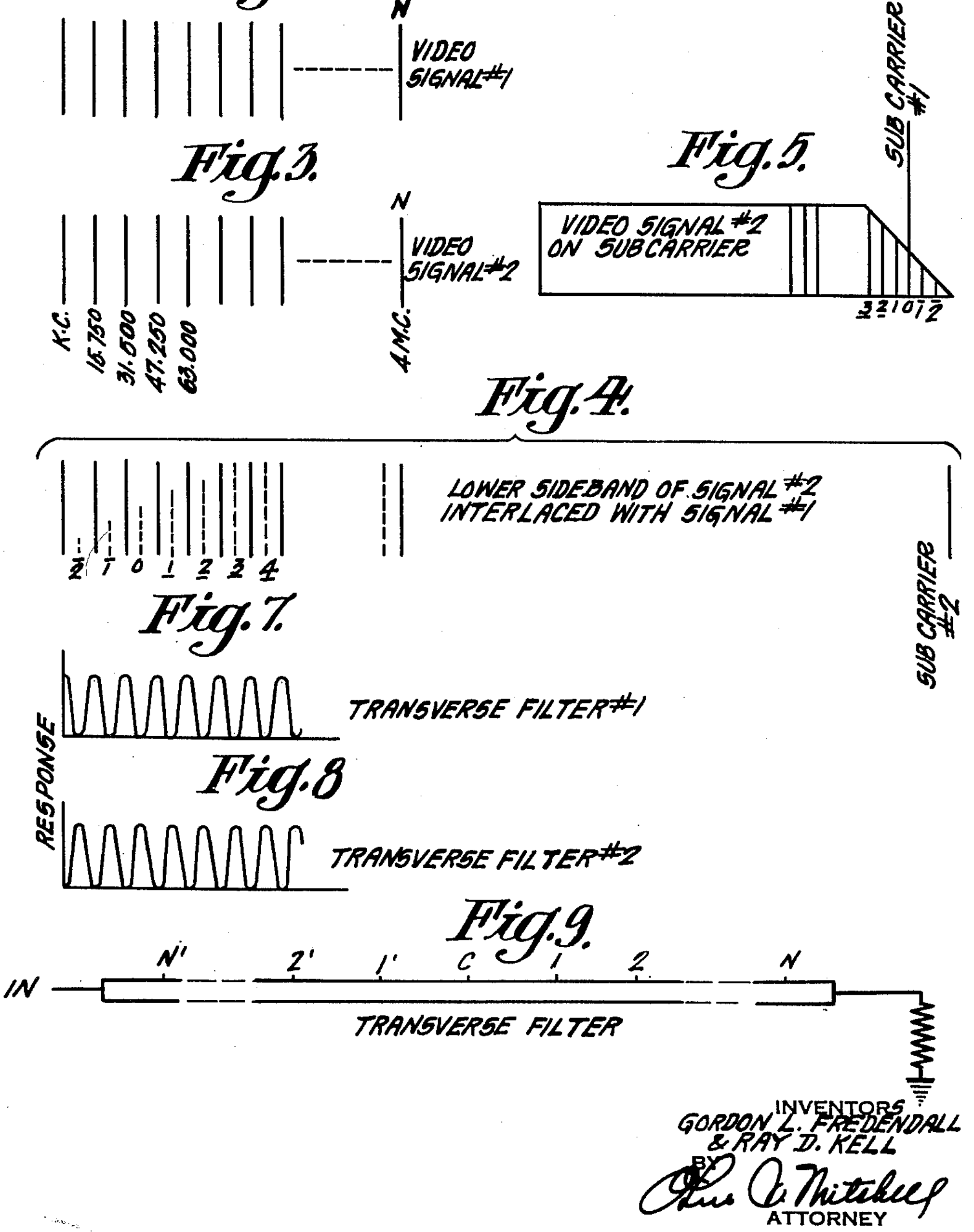
Figures 9 and 10 show the transverse filter in the receiver.

Both video signal 1 and video signal 2 have the same scanning frequency and therefore the distribution of the energy clusters will be alike as seen in Figure 2 and Figure 3. Either one of the video signals can have their frequency bands shifted to interleave into the frequency band of the other video signal. In the example illustrated here, the video signal 1 is stationary and video signal 2 is shifted as in Figure 4. The video signal 1 originates at the signal source 1 and is modulated at the modulator 3 by subcarrier I, generated by oscillator 5. One of the sidebands of the modulated signal is then removed by the vestigial sideband filter 7, and the remaining signal is best at modulator 9 with subcarrier II, generated by the local oscillator 11. The new signal will have its higher sideband removed by the low-pass filter 13. Now if subcarrier I and subcarrier II are properly chosen, the remaining lower sideband will correctly interleave with video signal 1 as in Figure 4. A reasonable value for for subcarrier I would be a frequency of 10 megacycles and a reasonable value for subcarrier II would be 10480.375 kilocycles of a line scanning frequency of 15750 lines per second.

In practice, the cutoff of the vestigial sideband would be much less abrupt than is shown in the Figure 5. However, a reasonable vestigial sideband is about .5 megacycle. The small numbers in Figure 5 indicate the frequency clusters which will interleave as shown in Figure 4.

The converted signal of video signal 2 is combined with video signal 1 at mixer 15 and transmitted by transmitter 17 by means of methods well known to those skilled in the art.

Figure 6:
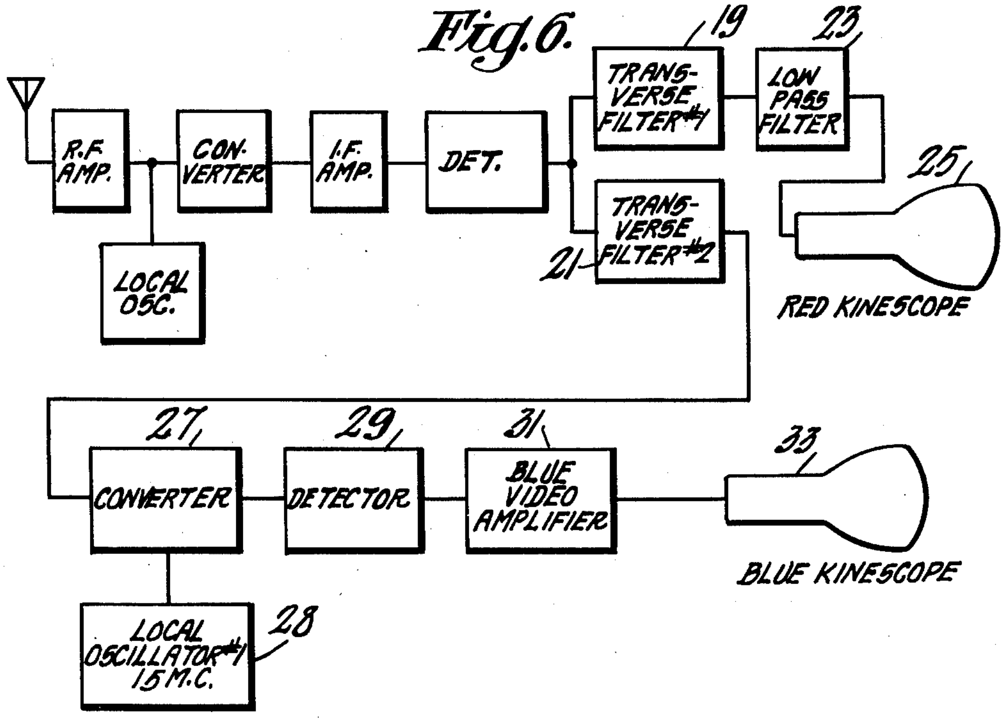

At the receiver, Figure 6, the received signal, is demodulated in the customary manner yielding signals as shown in Figure 4. Two transverse filters, filter 19 and filter 21, are used for the separation of the signal. The construction of the filters will be considered later. Two such filters may be designed to have such characteristics as shown in Figures 7 and 8. Filter 19 selects the frequency components without phase distortion and filter 21 selects the lower sideband as shown in dotted lines in Figure 4. Signal output of filter 19 is passed through a low-pass filter 23 to kinescope 25.

On the other hand, the signal from the transverse filter 21 is first converted at the converter 27 by the local oscillator 28 to its original line scanning frequency. If the values mentioned above for the local oscillator frequencies at the transmitter are used, then a frequency of 15 megacycles for oscillator 28 is chosen. After the signal is converted it moves through detector 29, video amplifier 31, and finally to the kinescope 33.

In the foregoing description the number of video signals transmitted over the same band was limited to two. However, it is obvious that any number of video signals can be interleaved as long as the energy valleys are broad enough to accommodate all the energy peaks of the other video signals without interfering in each other.

Figure 12:
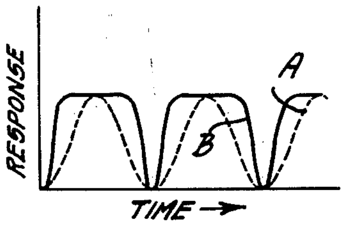
Figure 12 shows graphically the response characteristics of transverse filters.
Figure 11:
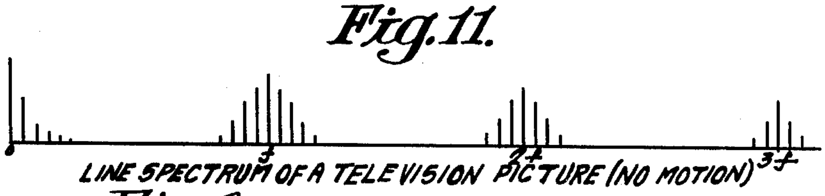
Figure 11 is a graphical illustration of the typical line spectrum of a video picture without motion. When motion exists the satellite frequencies increase somewhat in size.

For the transverse filter, a distortionless transmission line Figure 9, terminated in the characteristic impedance, is used. Output taps are placed at regular intervals along the transmission line in such a manner that there is one middle tap C and adjoining it other taps 1, 2—N on one side, and 1′, 2′—N′ on the other side. To get an attenuation curve for the frequency band as shown in Figure 11, the outputs from the mentioned taps have to be combined in a correct sequence and in a correct magnitude. The correct sequence is where the outputs from the two points equidistant from the center tap are connected together to obtain the correct magnitude, their output is then attenuated to an appropriate value, and the result added to the correctly attenuated outputs of the other sums of outputs of points equidistant from point C. This resulting output can be either added or subtracted from the output of tap C. If only two video signals are used then an attenuation curve like curve A in Figure 12 is appropriate enough. Here only the center tap C and two adjacent points, point 1 and point 1′ are used. The more taps that are taken the more square elements the attenuation curve will have, and, of course, be much more selective. The correct magnitude of the output is given by the formula:

$$(A_n+B_n)\sin\frac{n\theta}{3}$$

where $n$ is the number of the equidistant tap in mind, A and B the voltages at each tap respectively, and $\theta$ is the approximate half-width of the energy peaks.

In the drawings a simple system for two interleaved colors was described. In this case the connections of the transverse filter are as follows: to get the attenuation character of Figure 7, the outputs of the side taps are added to the output from tap C, to get the attenuation curve of Figure 8, the outputs of the side taps are subtracted from the output of point C.

Figures 10, 13:
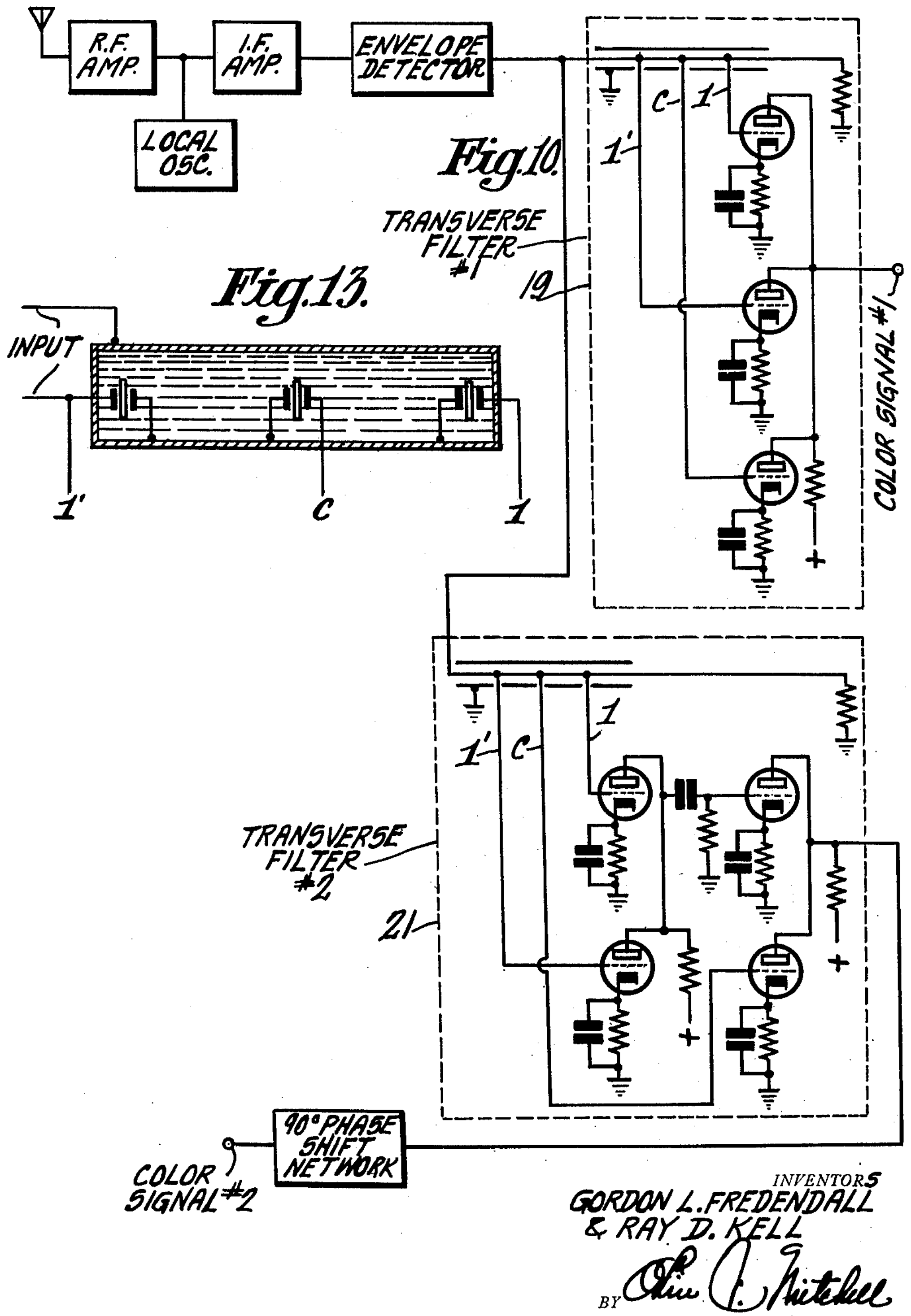
Figure 13 illustrates a more detailed view of a liquid type filter.

The separation of the two points 1 and 1′ is $2/f$ where $f$ is the frequency of separation of adjacent peaks. This represents a delay of $$\frac{2}{15750}\text{ sec.}=127\mu\text{ sec.}$$

for a line scanning frequency of 15750 C. P. S. The fidelity of the line must extend up to the top video frequency. Liquid delay lines can also be used very successfully as filters. If mercury delay lines terminated in crystals are used for the transverse filters, a slight modification of the system outlined above is desirable because such delay lines are inherently high-pass filters and are not suitable for separation of the low-pass signal shown in Figure 4. The modification involves separation of the two signals while they are in the intermediate frequency range, say 1–5 megacycles, which is well above the cutoff of a mercury delay line. A mercury delay line is shown in Figure 13. Details concerning mercury delay lines and other liquid delay lines are known in the art and may be found well described in the published art such as, for example, in the book entitled "Components Handbook" (Radiation Lab. Series by Blackburn, published by McGraw, Hill).

If the system comprises more than two interleaved colors, then all video filters can be made to have the characteristics of the curve B shown in Figure 12. Before each filter a frequency shifting device is attached to shift the band into the correct position for the transverse filter to pick out the wanted video signal.

From the detailed description given above, the operation of the system can be readily recognized. Two video signals with similar energy cluster characteristics are interwoven after the band of one video signal is displaced by half the frequency distance from one energy cluster to the next. The interwoven signal is transmitted in one of the many fashions well known to those skilled in the art. The received signal is detected and demodulated in well known operations and then the interleaved trains of information are separated by means of transverse filters, these filters consisting of tapped outputs taken along a distortionless transmission line. The filtered signals are then converted to their original frequencies and represent the original video signal. Suitable filters are well known in the art. A good discussion of filters is given in a paper entitled, "Transversal Filters" by Heinz E. Kallmann in the Proceedings of the Institute of Radio Engineers for July 1940, pages 302–310, inclusive.

The system of our invention has been found to be positive in its operation and it will be understood that modifications may be made and that no limitations upon our invention are intended other than are imposed by the scope of the appended claims.

What we claim as new and desire to secure by Letters Patent of the United States is as follows:

1. A receiver system for detecting a composite video signal composed of at least two interleaved video signals, means for separating said video signals from each other, said latter means including filters composed of transmission lines terminated in the characteristic impedance, said transmission lines having tapped outputs at regular intervals and means for combining the said outputs with another output taken from a tap in the middle of an interval to attenuate all frequencies except the ones belonging to the video signal which is desired to filter out.

2. A receiving system comprising means for detecting a composite video signal composed of two interleaved video signals, a transverse filter composed of a transmission line terminated in the characteristic impedance and a tap at each of two points equidistant and on opposite sides of a third tapped point in said transmission line, the output of said middle point connected to add to the sum of the outputs of the other two tapped points, and a second transmission line with tapped points as in the first transmission line and the output from said middle point connected to subtract from the sum of the outputs of the other two tapped points.

3. Apparatus according to claim 2 wherein a liquid delay line is used as a video signal filter.

4. Apparatus according to claim 2 including a transverse filter composed of a mercury delay line terminated in crystals.

GORDON L. FREDENDALL.
RAY D. KELL.

References Cited in the file of this patent

UNITED STATES PATENTS

| Number | Name | Date |
|---|---|---|
| 1,769,918 | Gray | July 8, 1930 |
| 1,769,919 | Gray | July 8, 1930 |
| 1,769,920 | Gray | July 8, 1930 |
| 2,300,501 | Grundman | Nov. 3, 1942 |
| 2,303,830 | Dome | Dec. 1, 1942 |
| 2,333,245 | Hansell | Nov. 2, 1943 |